J. K. HOME.
Patterns for Pipe-Elbows.

No. 141,645.            Patented August 12, 1873.

Witnesses:
Richard Dulman
John McIntosh

Inventor:
John King Home

UNITED STATES PATENT OFFICE.

JOHN KING HOME, OF ALMONTE, CANADA.

IMPROVEMENT IN PATTERNS FOR PIPE-ELBOWS.

Specification forming part of Letters Patent No. 141,645, dated August 12, 1873; application filed January 24, 1873.

*To all whom it may concern:*

Be it known that I, JOHN KING HOME, of Almonte, county of Lanark, Province of Ontario, Canada, have invented certain Improvements in Elbows for Pipes, of which the following is a specification:

The invention relates to an adjustable elbow-pattern formed of two sector-plates, which, when adjusted or set to indexes or scales marked thereon, the required curves or sweep is described, from which to cut the pattern or shape on a plane surface to form the miter-points of elbow-pipes for any desired angle.

Figure 1:
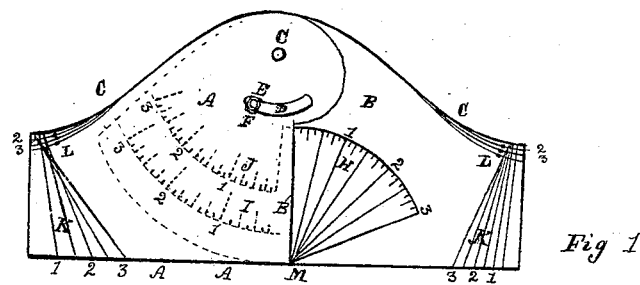
Figure 2:
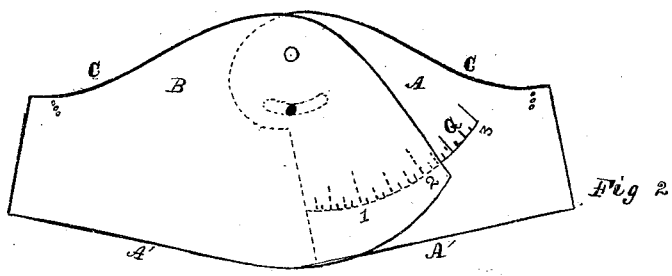
Figure 3:
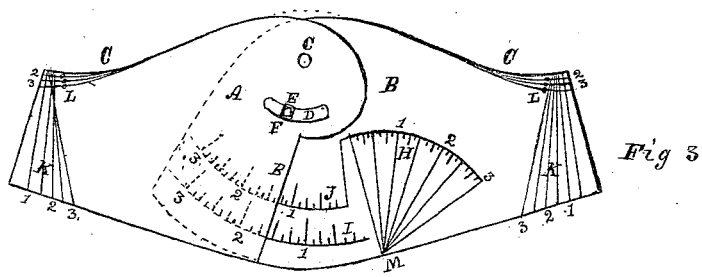

Figure 1 is a front view of the adjustable elbow-pattern embodying my invention. Fig. 2 is a back view with sector-plates partly extended. Fig. 3 is a front view with the sector-plates partly extended.

A and B are sector-plates pivoted at C, and of the form shown in the drawing. Pivot C is so placed as to give the exact sweep or curve of the edges C C to scribe the large and small end of the elbow to be made. In the plate A is a curved slot, D, through which to pass a screw, E, provided with a nut, F, to hold the plates firmly together at any adjusted position. On the back of the plate A is a scale, G, to indicate the bevel shown of the edges A A, and when the edge B of plate A is set at corresponding figures on scales I and J, will give the same bevel or angle as the edges A A. On the face side of the plate B is a scale, H, to indicate the different angles that can be obtained by adjusting the edge B of plate A at corresponding figures on scales I and J. I is a scale on the plate B, to indicate the point to where the edge B of the plate A is to be adjusted to give the required sweeps of the edges C C for scribing the large end of the elbow. J is a similar scale, to which the edge B is to be adjusted thereon to give the required sweep of the edges C C for scribing the miter for the small end of the elbow to be made. K K are scales that are to lie parallel with the edges of the plate to be cut when using the scales I and J. L are holes marking the diverging lines to be followed when using scales I and J from figure 2 to figure 3.

I will now describe the manner of using my adjustable elbow-pattern. When the bevel or angle of the elbow to be made is ascertained, close the sector-plates, and apply a bevel-rule along the edges A A and up on scale H, at any angle desired from center-point m—for instance at figure 1, then adjust the edge B to the scale I at figure 1, and scribe the plates to be cut along the edge C C. Next, adjust the edge B on the scale J at the figure 1, and scribe the plates to be cut along the edges C C. The lines of scale K are to lie parallel with the edges of the plates to be cut, so to keep the pattern in a proper position when using the scales I and J. When both plates are formed and the miters are brought together the elbow will be of the exact bevel required.

I claim as my invention—

1. An adjustable elbow-pattern to describe the required sweep or miter previous to being formed into sections, and which, when united at the miter-joints, form a pipe-elbow of any required bevel.

2. The pivot C, so placed as to give the exact sweep or curve of the edges C C to scribe the large and small end of the elbow to be made.

3. The sector-plates A B, having a series of scales, as set forth, pivoted together at the point C, and provided with a slot, D, and screw E, or other suitable fastenings, substantially as and for that purpose set forth.

JOHN KING HOME.

Witnesses:
RICHARD DULMAGE,
JOHN McINTOSH.